(12) United States Patent
Freyman et al.

(10) Patent No.: US 8,284,761 B2
(45) Date of Patent: Oct. 9, 2012

(54) SYSTEM AND METHOD FOR RESPONSIVE LOSS COMPENSATION IN A VOICE OVER INTERNET PROTOCOL COMMUNICATION ENVIRONMENT

(75) Inventors: Phillip Kent Freyman, Elgin, IL (US); Robert C. Stein, Coopersburg, PA (US)

(73) Assignee: General Instrument Corporation, Horsham, PA (US)

( * ) Notice: Subject to any disclaimer, the term of this patent is extended or adjusted under 35 U.S.C. 154(b) by 1301 days.

(21) Appl. No.: 11/753,289

(22) Filed: May 24, 2007

(65) Prior Publication Data
US 2007/0286179 A1    Dec. 13, 2007

Related U.S. Application Data

(60) Provisional application No. 60/808,921, filed on May 25, 2006.

(51) Int. Cl.
H04L 12/66 (2006.01)
H04B 1/00 (2006.01)
H04J 3/22 (2006.01)

(52) U.S. Cl. ............... 370/352; 455/63.1; 370/465

(58) Field of Classification Search .......... 370/352–356, 370/241, 252, 286, 389, 392, 465; 455/63.1; 709/228, 232, 234
See application file for complete search history.

(56) References Cited

U.S. PATENT DOCUMENTS

| | | | |
|---|---|---|---|
| 2003/0161386 A1* | 8/2003 | Schilling | 375/141 |
| 2005/0180405 A1* | 8/2005 | Bastin | 370/352 |
| 2006/0218302 A1* | 9/2006 | Chia et al. | 709/245 |

FOREIGN PATENT DOCUMENTS

JP    2003-108265    * 10/2004

OTHER PUBLICATIONS

Telecommunications Industry Association, TIA-912: Voice Gateway Transmission Requirements, Apr. 2002.*
S. Hughey, "[pktc2-rst] PC 2.0 EMTA Specification", message posted to "PacketCable 2.0 Primary Line Majordomo List" electronic mailing list, dated May 25, 2006.
J. Rosenberg et al., "An Offer/Answer Model with the Session Description Protocol (SDP)", RFC 3264, Internet Engineering Task Force, Jun. 2002.
Alliance for Telecommunications Industry Solutions, "American National Standard for Telecommunications-Loss Plan for Evolving Digital Networks", ANSI T1.508-1998, American National Standards Institute, Aug. 1998.
Alliance for Telecommunications Industry Solutions, "American National Standard for Telecommunications-Network to Customer Installation Interfaces—Analog Voicegrade Switched Access Lines Using Loop-Start and Ground-Start Signaling", ANSI T1.401-2000, American National Standards Institute, Nov. 2000.
Telecommunications Industry Association, "TIA/EIA Telecommunications Systems Bulletin: Telecommunications-IP Telephony Equipment-Voice Gateway Loss and Level Plan Guidelines", TIA/EIA/TSB122-A, Mar. 2001.

* cited by examiner

*Primary Examiner* — Asad M Nawaz
*Assistant Examiner* — Joel Hamel
(74) *Attorney, Agent, or Firm* — Stewart M. Wiener

(57) ABSTRACT

A system and method for implementing dynamic end-to-end loss compensation in a VoIP communication system is provided. The invention utilizes standard signaling protocol to accommodate for the characteristics of various call endpoints, and in particular, provides for an SDP parameter that conveys terminal characteristics between endpoints of a VoIP connection.

4 Claims, 4 Drawing Sheets

SYSTEM AND METHOD FOR RESPONSIVE LOSS COMPENSATION IN A VOICE OVER INTERNET PROTOCOL COMMUNICATION ENVIRONMENT

CROSS-REFERENCE TO RELATED APPLICATION

This application claims priority to the filing date of a U.S. provisional patent application having Ser. No. 60/808,921, entitled "NEGOTIATING/ADJUSTING DYNAMIC MTA LOSS PLAN USING VOIP SIGNALING", filed on May 25, 2006, which is incorporated herein by reference in its entirety.

FIELD OF THE INVENTION

This invention relates to the field of telephony, and in particular to voice over internet protocol based telephony and the end-to-end losses associated therewith.

BACKGROUND OF THE INVENTION

Presently, public switched telephone network ("PSTN") land line telephony systems provide service utilizing centralized switching infrastructures which have knowledge as to each call termination end point type for a call. Based on this knowledge, this PSTN centralized switching infrastructure makes adjustments for end to end analog loss thereby optimizing performance with respect to acoustical audio level, audio distortion and echo. Guidance as to the audio loss across various end point types can be found in following standards: ANSI T1.508, "Network Performance—Loss Plan for Evolving Digital Networks" ("T1.508"); ANSI T1.401, "Network to Customer Installation Interfaces" ("T1.401"); TIA/EIA/TSB122A, "Telecommunications IP Telephony Equipment Voice Gateway Loss Level Plan Guidelines" ("TIA-122A"); and TIA/EIA/TIA-912, "Telecommunications IP Telephony Equipment Voice Gateway Transmission Requirements" ("TIA-912").

Current Voice over Internet Protocol ("VoIP") systems have adopted a fixed loss compensation approach at the VoIP end point based on these standards, and the assumption that the terminals at the two end points connected in a call will be of the same type (VoIP). This approach fails to recognize the current marketplace where the VoIP elements must, in fact, make connection to gateways for connection to PSTN land line services or to far end VoIP terminals which may not be compliant with the previously mentioned standards. This variability of far end terminals is not supported in current VoIP standards (PacketCable, ETSI, IETF or ITU), and with the industry movement to distributed call processing (SIP), the knowledge that historically has been available and resides in the PSTN infrastructure as to the type of far end connections is currently not available to the end points. Consequently, no information as to analog loss can be obtained and compensated for in response to such call connection variations.

Therefore, It would be advantageous to provide a system and method for dynamic end-to-end loss compensation in a VoIP system, with an ability to accommodate the characteristics of various types of terminals at the call endpoints. Furthermore, implementation of such utilizing Session Description Protocol ("SDP"), a protocol common to numerous IP telephony signaling schemes (Media Gateway Control Protocol—MGCP; Network-based Call Signaling—NCS; ITU H.323, etc.), would be desirable.

SUMMARY OF THE INVENTION

In accordance with the principles of this invention an improved system and method for implementing dynamic end-to-end loss compensation in a VoIP communication system is provided. The invention utilizes standard signaling protocol to accommodate for the characteristics of various call endpoints, and in particular, provides for an SDP parameter that conveys terminal characteristics between endpoints of a VoIP connection.

BRIEF DESCRIPTION OF THE DRAWINGS

For a complete understanding of the present invention and the advantages thereof, reference is now made to the following description taken in conjunction with the accompanying drawings, wherein.

DESCRIPTION OF PREFERRED EMBODIMENTS

Presently, many conventional IP telephony protocols such as MGCP, NCS, H.323 and SIP use SDPs to negotiate provision of media between the endpoints in a connection. In accordance with this invention, protocol support is provided at the session level enabling the identify the terminal types participating in a given VoIP connection. These terminal types are identified by introducing a new session attribute parameter, the Voice Gateway Port ("vgwp"). This new parameter can be implemented in accordance with port definitions described in TIA-912. The values that may be specified for vgwp are shown in Table 1 below.

TABLE 1

| vgwp Value | Terminal Type |
| --- | --- |
| ONS | On premise station |
| OPS | Off premise station |
| DGS | Digital station |
| WAN | Wide area network |
| DAL | Digital access line |
| FXO | Foreign exchange office |
| FXD | Foreign exchange digital |
| ATT | Analog trunk tie |

Examples of session attributes in accordance with Table 1 as they would appear within an SDP are: a=vgwp:ons; a=vgwp:dal; a=vgwp:fxd; etc.

Using the above terminal types, most Media Terminal Adapter ("MTA") devices would be classified as ONS. The most typical type of connection in an on-network call connection would be between an ONS terminal and a digital access line (DAL). Off-network connections (involving a media gateway as a path to a PSTN) would most likely have an ONS terminal connecting to a foreign exchange digital (FXD) terminal.

Figure 1:
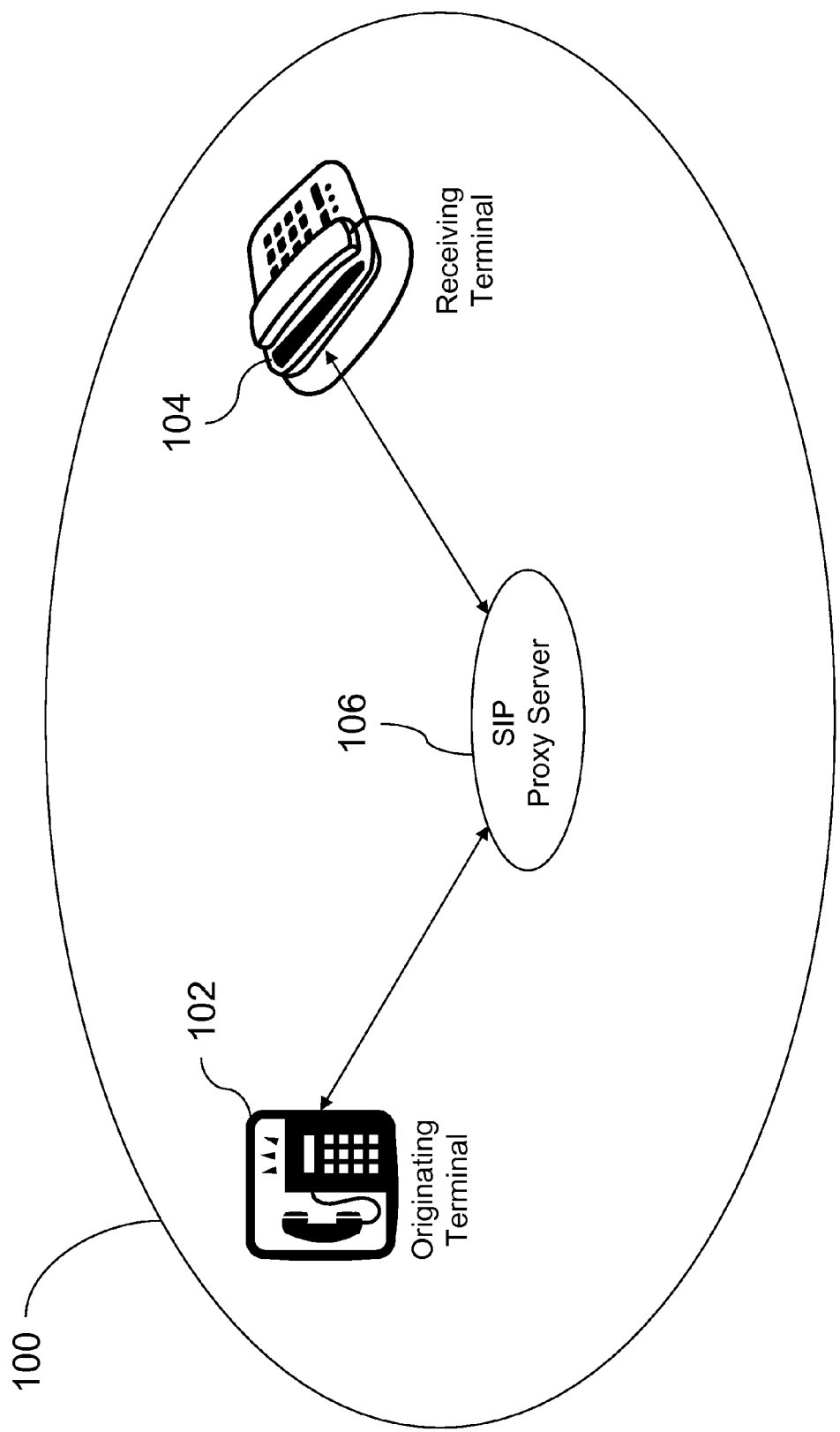
FIG. 1 is a diagram depicting a VoIP network in which a preferred embodiment of the invention is implemented.
Figure 2:
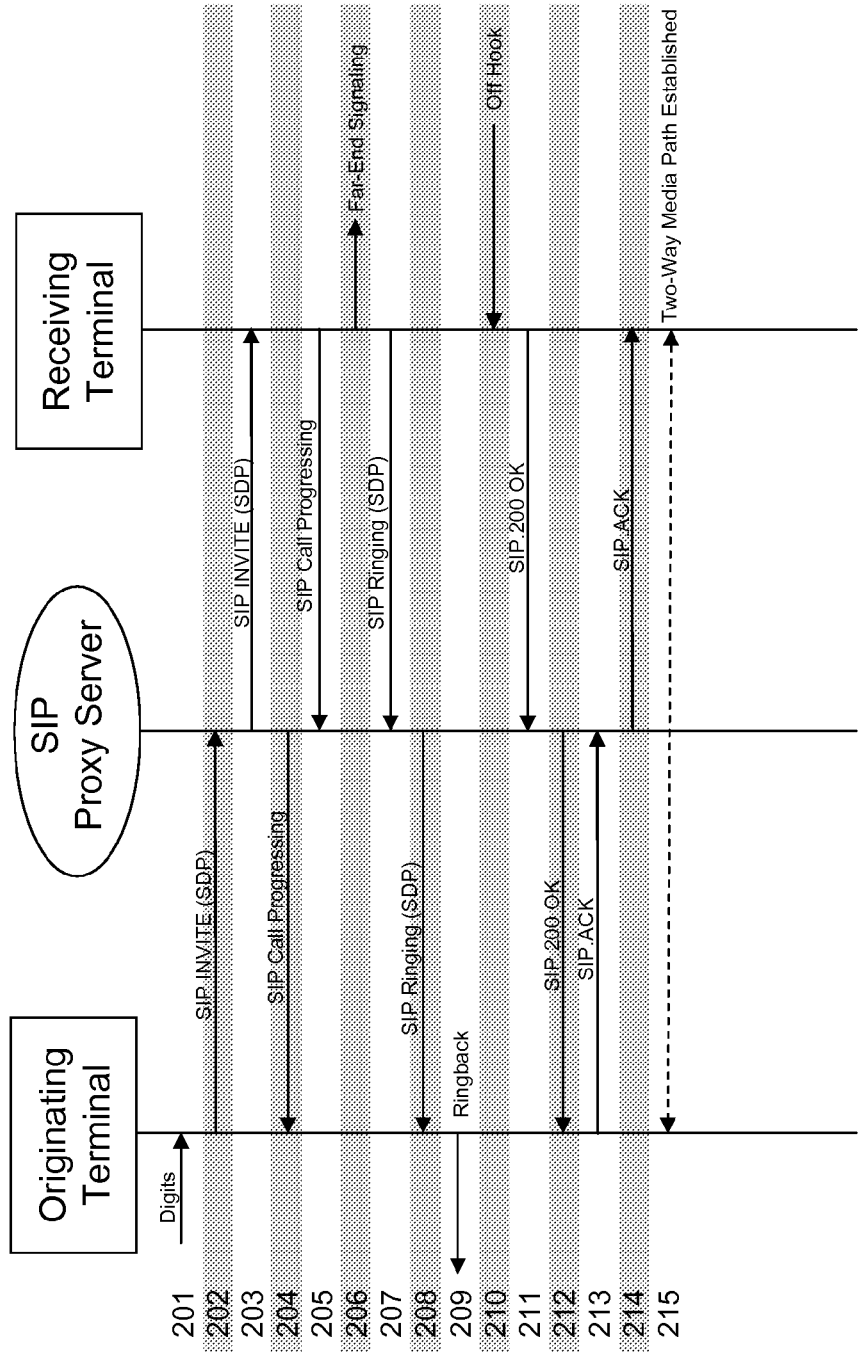
FIG. 2 is a process flow diagram depicting the steps of establishing a connection within a VoIP network in accordance with the invention.

As shown in FIG. 1, VoIP network 100 includes originating ONS terminal 102, receiving ONS terminal 104, and SIP proxy server 106. In accordance with the method illustrated in FIG. 2, originating terminal 102 dials digits specifying receiving terminal 104 (201) and sends an SIP INVITE request (202) to SIP proxy server 106. This request includes an initial SDP offer in compliance with Internet Engineering Task Force ("IETF") Standard RFC 3264, June 2002, An Offer/Answer Model with the Session Description Protocol (SDP). This initial SDP offer includes a vgwp attribute. An example of coding for such an SDP offer (with the vgwp attribute highlighted) is shown below:

```
INVITE sip:15022129145@subs.mso.net:5061 SIP/2.0
From: "305-735-8078"<sip:13057358078@sub1.mso.net:5061
To: <sip:15022129145@atlas4.atlas.carrier.net:5061>;user=phone
Call-ID: 1095342794-394429-128603327400114000000000-
0@207.103.222.77
CSeq: 1 INVITE
Via: SIP/2.0/UDP 207.103.222.77:5061;branch=z9hG4bKhjhs8ass877
Contact:
<sip:13057358078@207.103.222.77:5061;transport=UDP;user=phone>
Content-Type: application/SDP
Content-Length:274
v= 0
o= 13057358078 1095342794 1095342794 IN IP4 207.103.222.77
s= SIP Call
c= IN IP4 207.103.222.77
t= 0 0
a= vgwp:ons
m= audio 10000 RTP/AVP 0 2 18 101
a= rtpmap:0 PCMU/8000
a= rtpmap:2 G726-32/8000
a= rtpmap:18 G729/8000
a= rtpmap:101 telephone-event/8000
a= fmtp:101 0-15
a= ptime:20
```

SIP proxy server 106 determines that the target of the INVITE is a terminal on network 100 and forwards the INVITE to receiving terminal 104 (203). SIP proxy server 106 also provides originating terminal 102 with a message indicating that the call is progressing (204). Receiving terminal 104 provides SIP proxy server 106 with a message indicating that the call is progressing (205). Receiving terminal 104 examines and accepts the INVITE request. Typically, this would initiate alerting the subscribing party at receiving terminal 104 with a signal such as a ringback (206). Receiving terminal 104 recognizes the vgwp within the INVITE and makes a loss compensation determination as a function of its own terminal type and the information contained within the vgwp specifying a terminal type for originating terminal 102. If no vgwp was included in the SDP, static, non-responsive loss compensation would be employed.

The particular value of loss compensation to be implemented by the receiving terminal would be arrived at in accordance with an data table such as Table 1 below. This table, an adaptation of the Voice Gateway Loss Plan/Table 1 found in TIA-912, shows 64 loss compensation values, each of which would be implemented for a particular one-off-eight receiving terminal/line types connecting with a particular one-of-eight originating terminal/line types.

TABLE 2

| | | Loss | Originating Terminal/Line Type | | | | | | | |
|---|---|---|---|---|---|---|---|---|---|---|
| | | | ONS ↑ | OPS ↑ | DGS ↑ | WAN ↑ | DAL ↑ | FXO ↑ | FXD ↑ | ATT ↑ |
| Receiving Terminal/ Line Type | ONS | → | 6 dB | 3 dB | 0 dB | 0 dB | 3 dB | 0 dB | 3 dB | 3 dB |
| | OPS | → | 3 dB | 0 dB | −3 dB | −3 dB | 0 dB | 0 dB | 0 dB | 3 dB |
| | DGS | → | 9 dB | 6 db | 0 dB | 0 dB | 0 dB | 0 dB | 3 dB | 3 dB |
| | WAN | → | 9 dB | 6 db | 0 dB | 0 dB | 0 dB | 0 dB | 3 dB | 3 dB |
| | DAL | → | 9 dB | 6 db | 0 dB | 0 dB | 0 dB | 3 dB | 3 dB | 3 dB |
| | FXO | → | 0 dB | 0 dB | −9 dB | −3 dB | −3 dB | 0 dB | 0 dB | 0 dB |
| | FXD | → | 3 dB | 0 dB | −6 db | −3 dB | −3 dB | 0 dB | 0 dB | 0 dB |
| | ATT | → | 3 dB | 0 dB | −3 dB | −3 dB | −3 dB | 0 dB | 0 dB | 0 dB |

In this case ONS terminal 102 originated the VoIP connection to terminating ONS terminal 104 by sending an SIP INVITE request to an SIP Proxy Server receives an SDP containing an ONS vgwp. Receiving terminal 104 would then make a determination, in accordance with Table 2, to implement a +6 dB loss compensation in communications with originating ONS terminal 102.

In addition, the receiving terminal 104 would also provide SIP proxy server 106 with a message confirming that it is ringing (207). This also contains an SDP answer message (with a vgwp parameter specifying the receiving terminal type as ONS). This SDP answer could be sent in conjunction with the previously mentioned call progress message, and would be transmitted by SIP 106 to originating terminal 102 (208). Originating terminal 102 examines the incoming SDP, recognizes the vgwp within it and makes a loss compensation determination as a function of its own terminal type (ONS) and the terminal type specified in the incoming SDP (ONS). Originating terminal 102 would then make a determination, in accordance with Table 2, to implement a +6 dB loss compensation in communications with receiving ONS terminal 104. Again, if no vgwp was included in the incoming SDP, static, non-responsive loss compensation would be employed.

The VoIP call then progresses normally, with originating terminal 102 sending a local ringback tone to originating terminal 102 subscriber's analog access line (209), and the subscriber at receiving terminal 104 answering the incoming call by putting the terminal in an off-hook state (210). Receiving terminal 104 sends SIP 106 a signal indicative of the call being completed (211), and SIP 106 in turn relays this status to originating terminal 102 (211). Originating terminal 102 completes a standard three-way handshake by acknowledging receipt of the call completion signal to SIP 106 (213). Finally, SIP proxy server 106 relays the acknowledgement to receiving terminal 104 (214), and two-way media path between the terminals is established (215).

Figure 3:
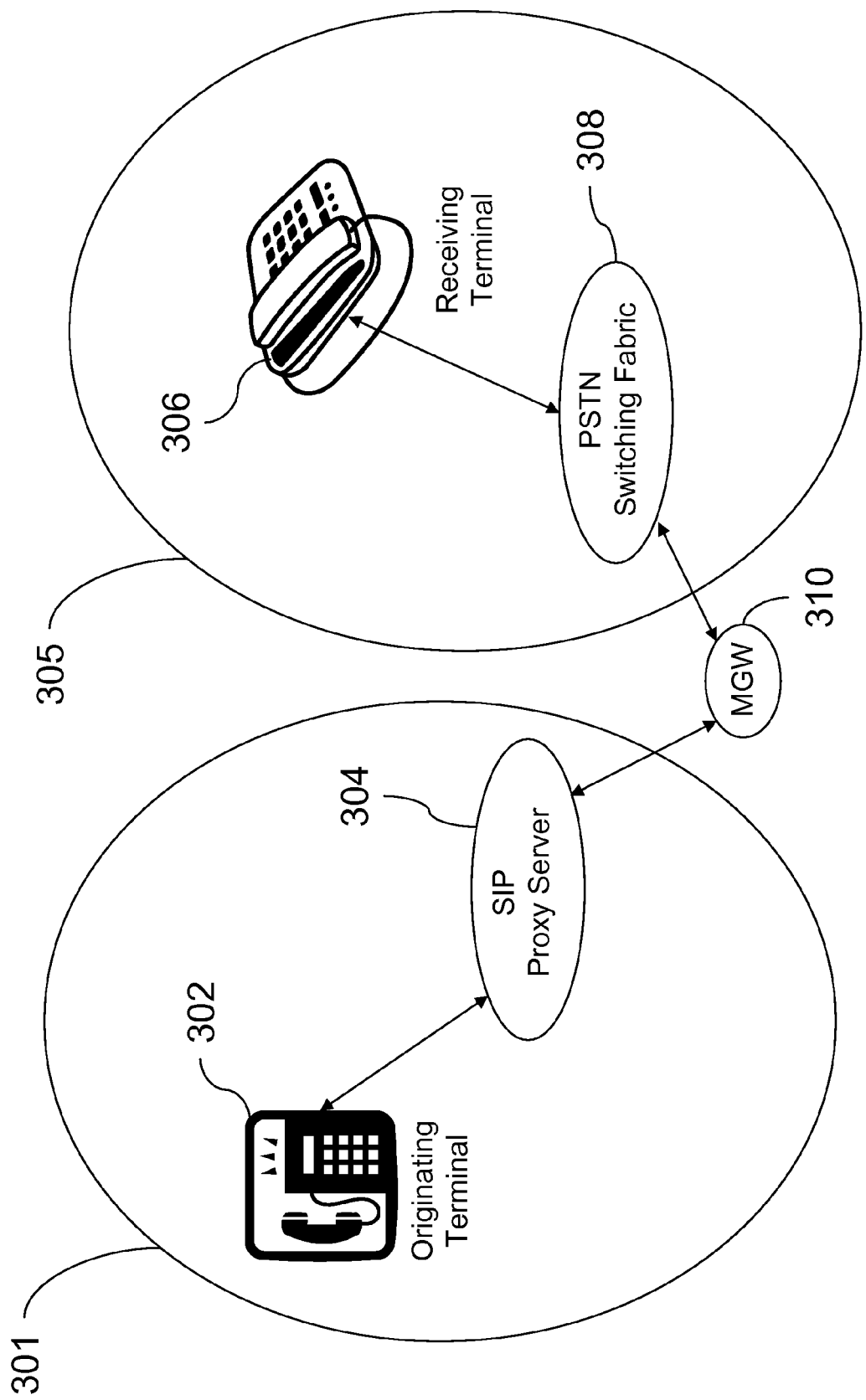
FIG. 3 is a diagram of a VoIP network linked with a PSTN network in which a preferred embodiment of the invention is implemented.
Figure 4:
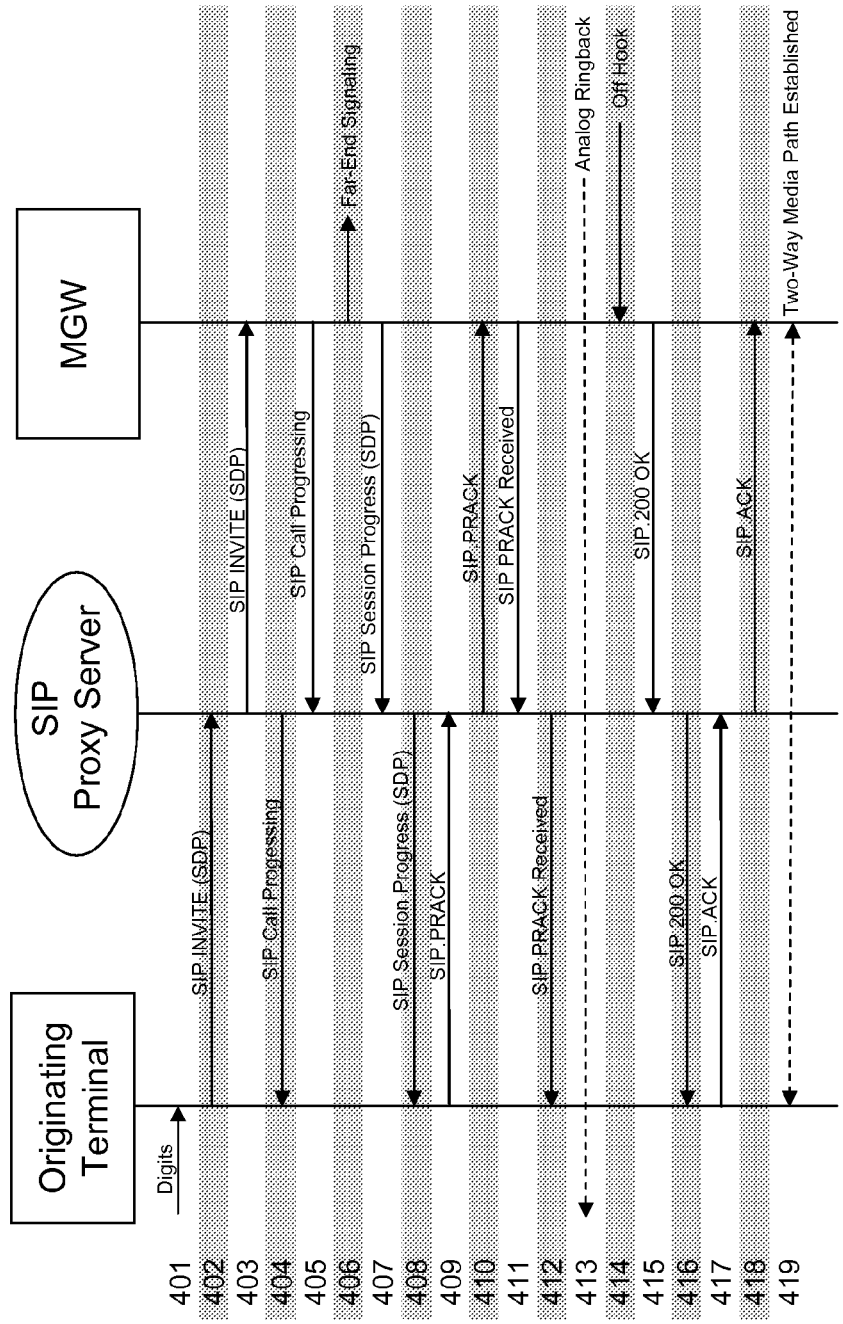
FIG. 4 is a process flow diagram depicting the steps of establishing a connection between a VoIP network and a PSTN network in accordance with the invention.

The invention also permits responsive loss compensation for off-network calls, that is calls from MTA terminals to a PSTN. As shown in FIG. 3, VoIP network 301 includes originating ONS terminal 302, receiving and SIP proxy server 304. PSTN network 305 includes receiving terminal 306 and PSTN switching fabric 308. Media gateway ("MGW") 310 provides a connection between VoIP network 301 and PSTN network 305. In accordance with the method illustrated in FIG. 4, originating terminal 302 dials digits specifying receiving terminal 306 (401) and sends an SIP INVITE request (402) to SIP proxy server 304. This request includes an initial SDP offer with a vgwp attribute.

SIP proxy server 304 determines that the target of the INVITE is a terminal associated with a PSTN and forwards the INVITE to MGW 310 (403). SIP proxy server 304 also provides originating terminal 302 with a message indicating that the call is progressing (404). MGW 310 recognizes the vgwp within the INVITE and makes a loss compensation determination as a function of its own terminal type and the information contained within the vgwp specifying a terminal type for originating terminal 302. If no vgwp was included in the SDP, static, non-responsive loss compensation would be employed.

MGW 310 now performs far end signaling to toward PSTN network 305 and receiving terminal 306 (406). This is typically ISDN User Part/Signaling System 7 signal that prompts ringing of receiving terminal. MGW 310 then signals SIP proxy server 304 that a session set-up is in progress (407). This message also contains an SDP answer message (with a vgwp parameter specifying the receiving terminal type as FXD, Foreign Exchange Digital—an out of network PSTN terminal). This SDP answer would then be transmitted by SIP proxy server 304 to originating terminal 302 (408). Originating terminal 302 examines the incoming SDP, recognizes the vgwp within it and makes a loss compensation determination as a function of its own terminal type (ONS) and the terminal type specified in the incoming SDP (FXD). Originating terminal 102 would then make a determination, in accordance with Table 2, to implement a 0 dB loss compensation in communications with receiving terminal 306. Again, if no vgwp was included in the incoming SDP, static, non-responsive loss compensation would be employed.

The session set-up progress message SDP also facilitates the set-up of an in-band media stream between MGW 310 and originating terminal 302. This in-band path is typically referred to as an early-media path. Originating terminal 302 provides SIP proxy server 304 with a provisional acknowledgement message, or PRACK (409), and SIP 302 relays this to MGW 310 (410). MGW 310 sends a message confirming thr reception of the PRACK to SIP 304 (411), and SIP proxy server 304 relays this to originating terminal 302 (412).

The VoIP call then progresses normally, with PSTN switching fabric 308 sending a ringback tone to originating terminal 302 via the previously established early media path (413), and the subscriber at receiving terminal 306 answering the incoming call by putting the terminal in an off-hook state (414). MGW 310 now sends SIP proxy server 304 a signal indicative of the call being completed (415), and SIP proxy server 304 in turn relays this status to originating terminal 302 (416). Originating terminal 302 completes a standard three-way handshake by acknowledging receipt of the call completion signal to SIP 304 (417). Finally, SIP proxy server 304 relays the acknowledgement to MGW 310 (418), and two-way media path is established (419).

Although the invention has been described herein by reference to exemplary embodiments thereof, it will be understood that modification and variation to such, without departing from the inventive concepts disclosed, can be made. For example, the commonality of SDPs makes them a preferred vector for delivering information in support of enabling a responsive compensation loss system and method in accordance with this invention. However, the invention is not to be limited to these particular protocol vectors, and may be signaled by other protocol processes. All such modifications and variations, therefore, are intended to be encompassed within the spirit and scope of the appended claims.

We claim:

1. A system for implementing responsive loss compensation in a voice over internet protocol (IP) communication network, the system comprising:
    an initiating terminal having a first known loss characteristic, and adapted to transmit a first Session Description Protocol (SDP) via said IP communication network wherein the first SDP includes at least one indicia of the first known loss characteristic;
    a receiving terminal having a second known loss characteristic, and adapted to transmit a second SDP via said IP communication network wherein the second SDP includes at least one indicia of the second known loss characteristic;
    a first dynamic loss processor associated with the receiving terminal and adapted to receive the first SDP from the initiating terminal and adjust receiving terminal loss compensation as a function of the at least one indicia of the first known loss characteristic and the second known loss characteristic;
    a second dynamic loss processor associated with the initiating terminal and adapted to receive the second SDP from the receiving terminal and adjust initiating terminal loss compensation as a function of the at least one indicia of the second known loss characteristic and the first known loss characteristic; and
    wherein the first known loss characteristic comprises a first audio power loss compensation value associated with a first terminal type specified for the initiating terminal, and the second known loss characteristic comprises a second audio power loss compensation value associated with a second terminal type specified for the receiving terminal.

2. The system of claim 1 wherein the first known loss characteristic and the second known loss characteristic are not determined based on characteristics of the IP communication network between the initiating terminal and the receiving terminal.

3. A method for implementing responsive loss compensation in a voice over internet protocol (IP) communication network, the method comprising:
    in an initiating terminal having a first known loss characteristic, transmitting a first Session Description Protocol (SDP) via said IP communication network wherein the first SDP includes at least one indicia of the known first known loss characteristic;
    in a receiving terminal having a second known loss characteristic, transmitting a second SDP via said IP communication network wherein the second SDP includes at least one indicia of the second known loss characteristic;
    in a first dynamic loss processor associated with the receiving terminal, receiving the first SDP from the initiating terminal and adjust receiving terminal loss compensation as a function of the at least one indicia of the first known loss characteristic and the second known loss characteristic;
    in a second dynamic loss processor associated with the initiating terminal, receiving the second SDP from the receiving terminal and adjust initiating terminal loss compensation as a function of the at least one indicia of the second known loss characteristic and the first known loss characteristic and
    wherein the first known loss characteristic comprises a first audio power loss compensation value associated with a first terminal type specified for the initiating terminal, and the second known loss characteristic comprises a second audio power loss compensation value associated with a second terminal type specified for the receiving terminal.

4. The method of claim 3 wherein the first known loss characteristic and the second known loss characteristic are not determined based on characteristics of the IP communication network between the initiating terminal and the receiving terminal.

* * * * *